United States Patent [19]
Ohashi et al.

[11] Patent Number: 5,971,889
[45] Date of Patent: Oct. 26, 1999

[54] SOLENOID SELF-CLEANING PRESSURE VALVE FOR AUTOMATIC VEHICLE TRANSMISSION

[75] Inventors: Tatsuyuki Ohashi; Masaharu Suzuki; Koichi Hasegawa; Takehiro Katakura; Tadahiro Suzuki, all of Wako, Japan

[73] Assignee: Honda Giken Kogyo Kabushiki Kaisha, Tokyo, Japan

[21] Appl. No.: 09/140,394

[22] Filed: Aug. 26, 1998

[30] Foreign Application Priority Data

Sep. 2, 1997 [JP] Japan .................................. 9-251425

[51] Int. Cl.$^6$ .................................................. F16H 61/00
[52] U.S. Cl. ........................... 477/149; 477/155; 477/160; 137/243
[58] Field of Search ................................ 477/143, 156, 477/158, 159, 160, 149, 155; 137/243, 244, 244.5; 677/116, 117

[56] References Cited

U.S. PATENT DOCUMENTS 3,682,043  8/1972  Bailey et al. ..................... 137/110 X
3,735,777  5/1973  Katzer et al. ..................... 137/514.5

FOREIGN PATENT DOCUMENTS 4-248059   9/1992   Japan .
5-17430    3/1993   Japan .
10-103480  4/1998   Japan .

Primary Examiner—Khoi Q. Ta
Attorney, Agent, or Firm—Armstrong, Westerman, Hattori, McLeland & Naughton

[57] ABSTRACT

A system for controlling an automatic vehicle transmission, including a gear system and hydraulic clutches which hold a member of the gear system stationary to produce gear reduction or reverse, having an oil line which connects the clutches to an oil pressure source, a pressure control valve having a solenoid provided in the oil line which generates a regulated oil pressure to be supplied to the clutches in response to a current supplied to the solenoid, a switch valve provided in the oil line which switches the oil pressure to be supplied to the one of the clutches between the regulated oil pressure and a line pressure. In the system, it is discriminated whether the pressure control valve does not supply the regulated oil pressure to the clutches and if so, a dither current is supplied to the solenoid such that the valve repeatedly performs a vibrational motion to remove any grit therefrom, thereby removing grit without causing gear-shift shock or clutch vibration.

19 Claims, 5 Drawing Sheets

SOLENOID SELF-CLEANING PRESSURE VALVE FOR AUTOMATIC VEHICLE TRANSMISSION

BACKGROUND OF THE INVENTION

1. Field of the Invention

This invention relates to a control system for an automatic vehicle transmission, particularly to a control system for oscillating a linear solenoid (more specifically, an actuator such as a pressure control valve, etc., connected or associated to linear solenoid) to remove foreign matter such as grit from the valve or actuator.

2. Description of the Related Art

Automatic vehicle transmissions are commonly shifted by using linear solenoid valves or the like (actuators) to operate hydraulic clutches. A technology for this is taught, for example, by Japanese Patent Publication No. Hei 5(1993)-17,430. Upon being supplied with current, the linear solenoid (more precisely, a pressure control valve associated with the linear solenoid) supplies the hydraulic clutch with hydraulic pressure proportional to the supplied current so as to engage the hydraulic clutch and shift gears.

Nowadays, direct control using many actuators such as linear solenoid valves, i.e., control without use of an accumulator or other such hydraulic pressure storage means, is becoming increasingly common in hydraulically operated automatic vehicle transmissions.

One problem encountered by hydraulically operated automatic vehicle transmissions is grit (foreign particles) getting mixed into the oil (automatic transmission fluid or ATF). Although most of the grit is caught by a magnet, filter and the like installed in the hydraulic control circuit, total removal of grit of a grain diameter under 100 $\mu$m is difficult. The remaining grit finds its way into the linear solenoids, pressure control valves and other components, where it is liable to cause locking, abnormal stroke and other problems.

Japanese Laid-Open Patent Application No. Hei 4(1992)-248,059, for example, teaches a method for removing grit by supplying a linear solenoid with dither current, i.e., oscillation-exciting current of a prescribed frequency and amplitude to vibrate the valve. The supplied dither current should be of large amplitude to ensure reliable grit removal.

However, supply of high-amplitude dither current results in large movement of the solenoid plunger and the pressure control valve. The large fluctuation in the hydraulic control pressure thus produces increased gear-shift shock and causes clutch oscillation or vibration. If the amplitude of the dither current is made small to avoid these problems, thorough grit removal cannot be achieved.

SUMMARY OF THE INVENTION

An object of this invention is therefore to overcome these problems of the prior art by providing a control system for an automatic vehicle transmission that uses dither current to reliably remove grit and other foreign matter from a solenoid valve or other actuator and enables restoration to normal operation.

This invention achieves this object by providing a system for controlling an automatic vehicle transmission, including a gear system and engaging elements which hold a member of the gear system stationary to produce gear reduction or reverse, comprising an oil line which connects the engaging elements to an oil pressure source, an actuator provided in the oil line which generates a first oil pressure to be supplied to one of the engaging elements in response to a current supplied thereto, current supply means for supplying the current to the actuator, a switch valve provided in the oil line which switches the oil pressure to be supplied to said one of the engaging elements between the first oil pressure and a second pressure, and discriminating means for discriminating whether the first oil pressure is not supplied to said one of the engaging elements, wherein said current supply means supplies the current to the actuator such that the actuator repeatedly performs a vibrational motion to remove a grit therefrom, when said discriminating means discriminates that the first oil pressure is not supplied to the one of the engaging elements.

BRIEF EXPLANATION OF THE DRAWINGS

This and other objects and advantages of the invention will be more apparent from the following description and drawings, in which.

DETAILED DESCRIPTION OF THE PREFERRED EMBODIMENT

An embodiment of the invention will now be explained with reference to the attached drawings.

Figure 1:
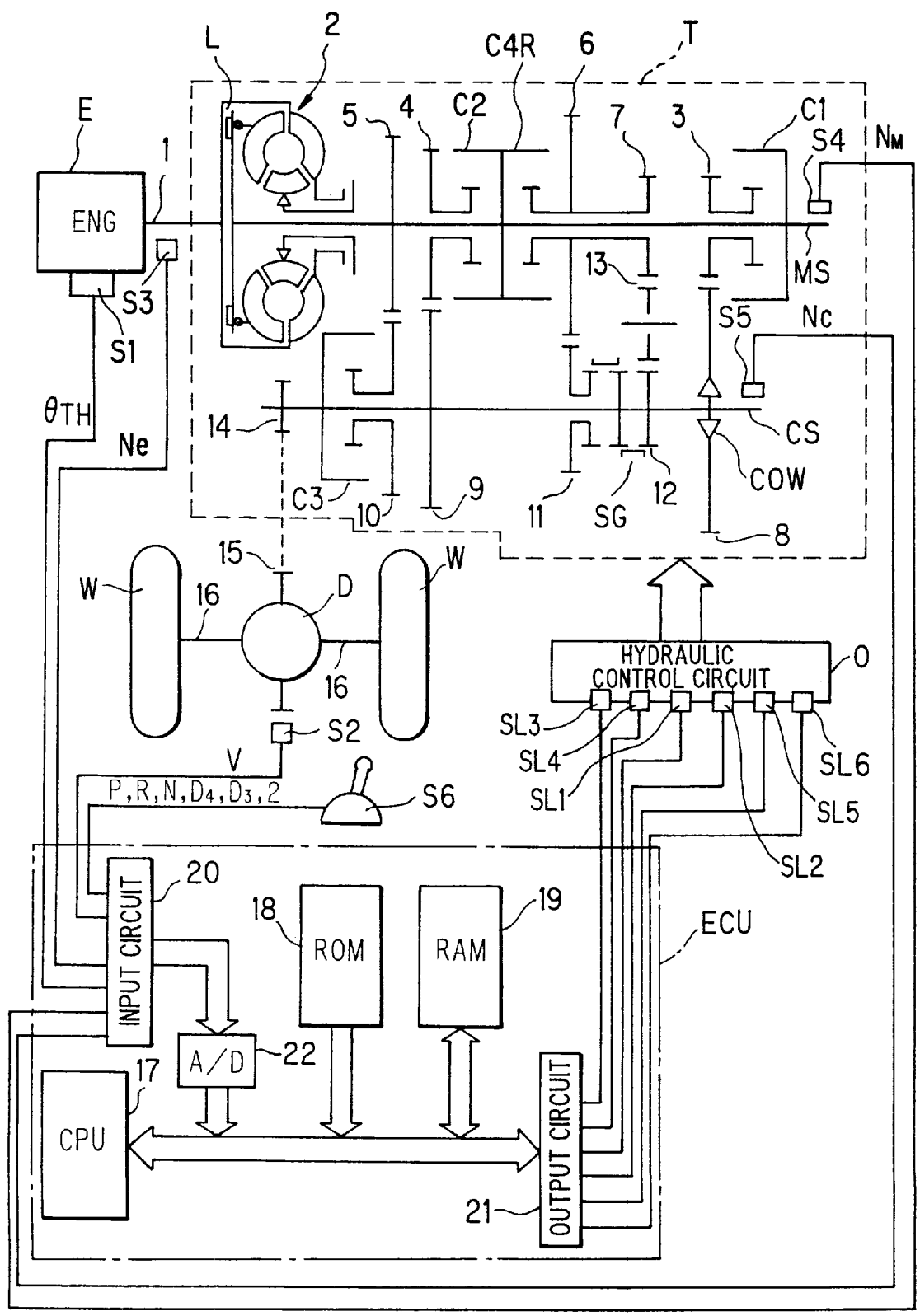
FIG. 1 is an overall schematic view of a control system for an automatic vehicle transmission.

FIG. 1 is an overall schematic view of a control system for an automatic vehicle transmission according to the invention.

As shown in FIG. 1, an automatic vehicle transmission T is equipped with a main shaft MS connected to the crankshaft I of an internal combustion engine E through a torque converter 2 having a lockup mechanism L and with a countershaft CS connected to the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first-speed (1st gear) is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second to fourth speeds, the counter first-speed gear 8 is supported by a one-way clutch COW.

The second-speed (2nd gear) is established when the main second-speed gear 4, rotatably supported on the main shaft MS, is connected with the main shaft MS by a second-speed hydraulic clutch C2.

The third-speed (3rd gear) is established when the counter third-speed gear 10, rotatably supported on countershaft CS, is connected with the countershaft CS by a third-speed hydraulic clutch C3.

The fourth-speed (4th gear) is established when the counter fourth-speed gear 11, rotatably supported on the countershaft CS, is connected with the countershaft CS by a selector gear SG and with this state maintained the main fourth-speed gear 6, rotatably supported on the main shaft MS, is connected with the main shaft MS by a fourth-speed/reverse hydraulic clutch C4R.

The reverse-speed (reverse gear) is established when the counter reverse gear 12 rotatably supported on the countershaft CS is connected with the countershaft CS by the selector gear SO and with this state maintained the main reverse gear 7 rotatably supported on the main shaft MS is connected with the main shaft MS by the fourth-speed/reverse hydraulic clutch C4R. The clutches C1, C2, C3 and C4R correspond to the engaging elements mentioned below.

The rotation of the countershaft CS is transmitted through a final drive gear 14 and a final driven gear 15 to a differential D, from where it is transmitted to driven wheels W, W through left and right drive shafts 16, 16 of the vehicle (not shown) equipped with the engine E and the automatic vehicle transmission T.

A throttle position sensor S1 is provided in the vicinity of a throttle valve (not shown) located in the air intake pipe (not shown) of the engine E. The throttle position sensor S1 outputs a signal indicative of the degree of opening θTH of the throttle valve. A vehicle speed sensor S2 provided in the vicinity of the final driven gear 15 outputs a signal once every rotation of the final driven gear 15. A crank angle sensor S3 is further provided in the vicinity of a camshaft (not shown) for outputting a CYL signal at a prescribed crank angle of a prescribed cylinder, a TDC signal at a prescribed crank angle of every cylinder, and a CRK signal once every subdivision of the prescribed crank angle (e.g., 15 degrees).

An input shaft rotational speed sensor S4 is provided in the vicinity of the main shaft MS for outputting a signal once every rotation of the main shaft MS. An output shaft rotational speed sensor S5 is provided in the vicinity of the countershaft CS for outputting a signal once every rotation of the countershaft CS. A shift lever position sensor S6 is provided in the vicinity of a shift lever installed on the vehicle floor near the driver's seat. The shift lever position sensor S6 outputs a signal indicating the position selected by the driver among the six positions (ranges) P, R, N, D4, D3 and 2.

The outputs of the sensors S1 etc. are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The microcomputer is also equipped with an A-D converter 22.

The outputs of the sensors S1 etc. are input to the microcomputer through the input circuit 20 and converted from analog values to digital values by the A-D converter 22. The digital signals are processed by a wave-shaping circuit and other processing circuits (not shown) and stored in the RAM 19.

The output of the vehicle speed sensor S2 and the CRK signal output of the crank angle sensor S3 are counted by counters (not shown) to ascertain the vehicle speed V and the speed of the internal combustion engine E. The outputs of the input shaft rotational speed sensor S4 and the output shaft rotational speed sensor S5 are counted to ascertain the rotational speed NM of the transmission input shaft and the rotational speed NC of the transmission output shaft. The CPU 17 has 8/16-bit capacity (8-bit external bus, 16-bit internal bus).

The CPU 17 of the microcomputer determines the appropriate gear (speed) and energizes or deenergizes the shift solenoids SL1, SL2, via the output circuit 21 and a voltage supply circuit (not shown), to control the shift valves (neither shown) of a hydraulic control circuit O, so as to disengage or engage the hydraulic clutches Cn corresponding to the current gear and the next gear.

During this gear shifting, the CPU 17 energizes or deenergizes linear solenoids SL3, SL4 via the voltage supply circuit so as to control or variably regulate the pressure supplied to the hydraulic clutches Cn. When gear-shift is not in progress, the engaged hydraulic clutches are supplied with line pressure obtained by reducing the hydraulic pressure of oil supplied by an oil pump (not shown).

Figure 2:
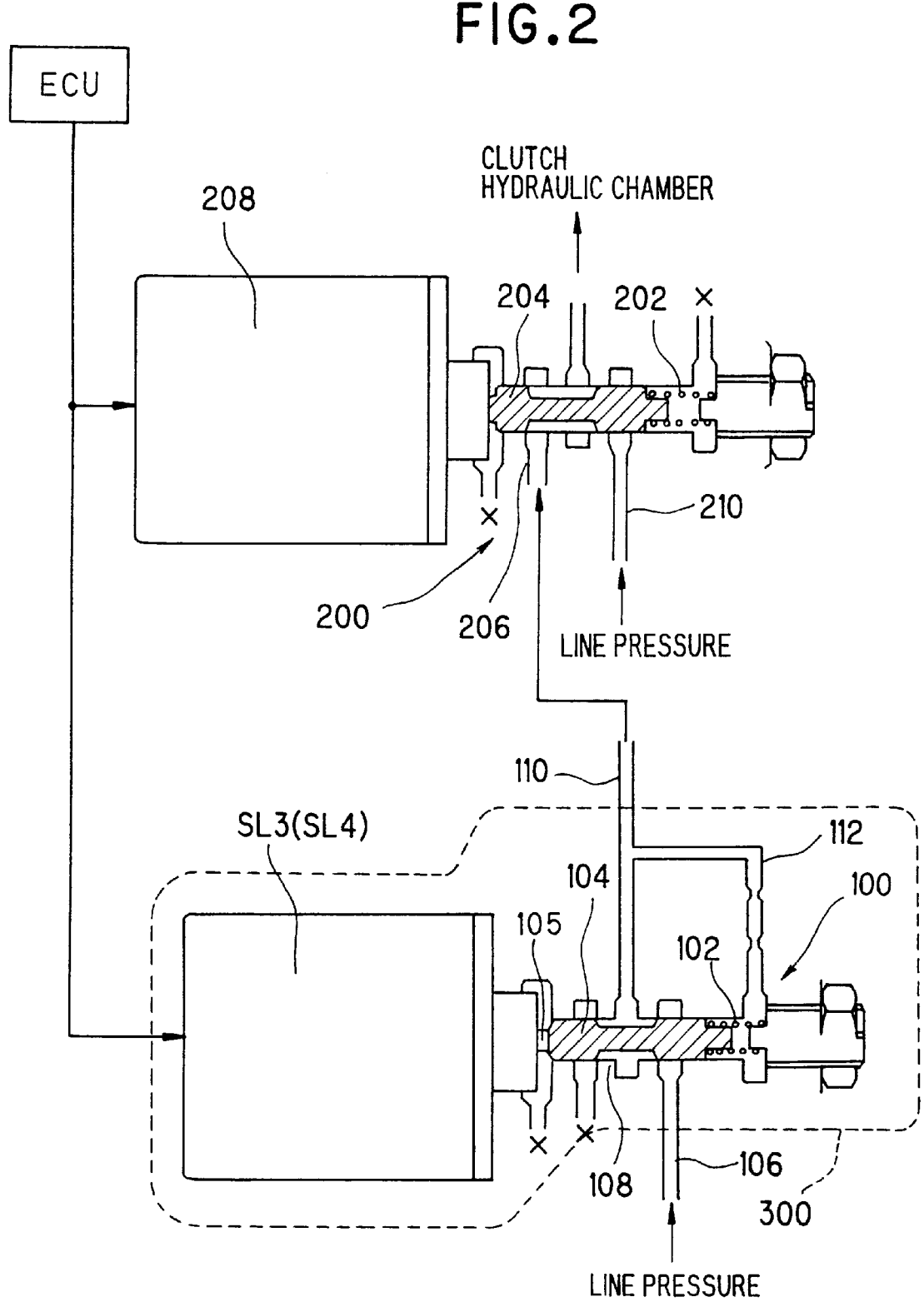
FIG. 2 is a view showing a linear solenoid and a pressure control valve connected to or associated with the linear solenoid illustrated in FIG. 1.

As shown in FIG. 2, the actuator 300 comprises a linear solenoid SL3 (or SL4) together with an associated pressure control valve 100. A spring 102 and a pressure regulator valve (spool) 104 are positioned to face the linear solenoid SL3 (or SL4). The spring 102 biases the pressure regulator valve 104 leftward in the drawing.

When the linear solenoid SL3 (or SL4) is excited, a plunger 105 moves to the right in the drawing against the spring force and presses the pressure regulator valve 104 to the right. On the other hand, pressurized oil from an oil pressure source (not shown) regulated to line pressure is supplied through a line-pressure supply line 106, passes through a gap (of, for example, 22–40 $\mu m$) defined by the position of the pressure regulator valve 104 relative to a valve body 108, proceeds to an output line 110 and is supplied to a switch valve 200.

When a spool 204 of the switch valve 200 is held in the position shown in the drawing by the force of a spring 202, the pressure output of the pressure control valve 100 is supplied through an inlet port 206 to the hydraulic chamber of the hydraulic clutch (not shown). When an on/off solenoid 208 is energized, the solenoid plunger (not shown) projects to move the spool 204 toward the on-position to the right in the drawing. This causes the line pressure present at an inlet port 210 to be applied to the clutch hydraulic chamber.

During gear-shift, the spool 204 of this embodiment is moved to the left to supply hydraulic pressure regulated by the pressure control valve 100 to the clutch hydraulic chamber, while, when gear-shift is not in progress (during driving with the clutch engaged), it is moved to the right to supply line pressure to the clutch hydraulic chamber.

A feedback line 112 branching from the output line 110 of the pressure control valve 100 feeds part of the output pressure back to the rear end of the pressure regulator valve 104. In the course of clutch oil pressure increase, when the leftward force on the valve owing to the feedback pressure becomes equal to the solenoid load, the gap between the pressure regulator valve 104 and the valve body 108 is closed to stop the oil pressure increase.

The oil pressure supplied to the clutch thus varies with increase/decrease in the current through the solenoid (the solenoid load). The portions marked with X's in the drawing are drains.

The CPU 17 shown in FIG. 1 also controls the operation of the lockup mechanism L of the torque converter 2 by, via the voltage supply circuit, to energize/deenergize a solenoid SL5 for on/off control of the lockup mechanism L and a linear solenoid SL6 for capacity control thereof.

The structure of the hydraulic control circuit O is described in detail in the assignee's earlier Japanese Patent Application No. Hei 8(1996)-253,633 etc. and will not be explained further here.

The operation of the control system for an automatic vehicle transmission according to the invention will now be explained.

Figure 3:
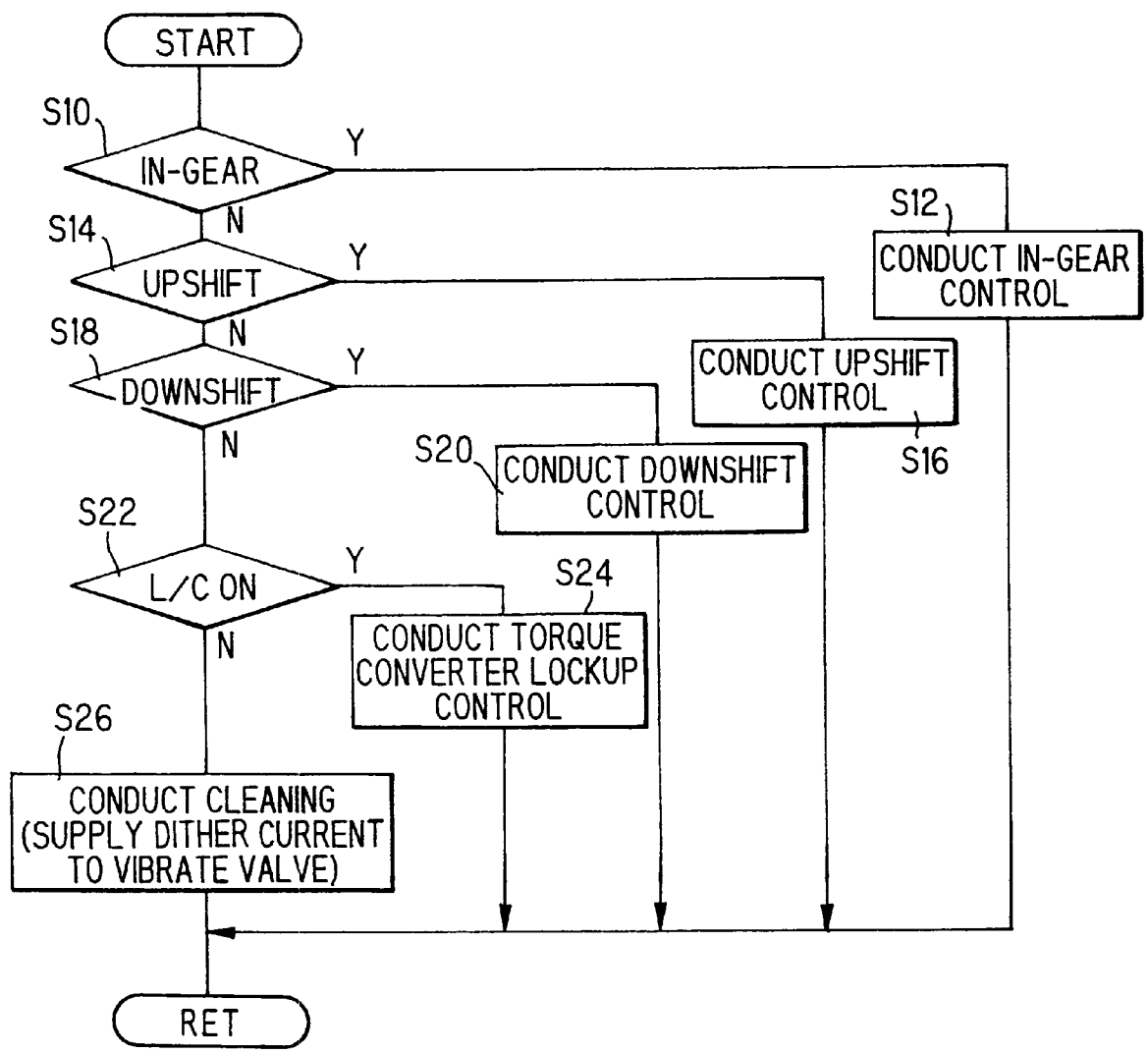
FIG. 3 is a flow chart showing the operation of the system illustrated in FIG. 1.

FIG. 3 is a flow chart of the system operation, specifically a flow chart of the operations for controlling supply of current to the linear solenoids SL3, SL4. This program is executed at regular intervals (of, for example, 20 msec).

The program starts at S10, in which it is checked whether the transmission is in-gear, i.e., whether the shift lever has just been moved from the N or P position to the D or R range. When the result is YES, the program proceeds to S12, in which the in-gear control is effected to establish the forward or reverse. During the in-gear control, the actuators are controlled to supply the clutch hydraulic chambers of the clutch to be engaged with progressively increasing hydraulic pressure.

When gear-shift is not in progress, the spool 204 is moved to the right in FIG. 2 to supply the clutch hydraulic chambers of the first-speed hydraulic clutch C1 etc. with line pressure without passing it through the pressure control valve 100.

When the result in S10 is NO, the program goes to S14, in which it is checked whether a gear-shift is necessary, specifically whether an upshift is necessary. When the result is YES, the program goes to S16, in which the required upshift is enabled by controlling the currents supplied to the linear solenoids SL3, SL4 to progressively lower the hydraulic pressure that the pressure control valve 100 supplies to the hydraulic clutch on the lower gear (the current gear clutch being disengaged) and progressively increase the hydraulic pressure that the pressure control valve 100 supplies to the hydraulic clutch on the higher gear (the next gear clutch to be engaged).

When the result in S14 is NO, the program goes to S18, in which it is checked whether a downshift is necessary. When the result is YES, the program goes to S20, in which the required downshift is enabled by controlling the currents supplied to the linear solenoids SL3, SL4 to progressively lower the hydraulic pressure that the pressure control valve supplies to the hydraulic clutch on the higher gear (the current gear clutch being disengaged) and progressively increase the hydraulic pressure that the pressure control valve supplies to the hydraulic clutch on the lower gear (the next gear clutch to be engaged).

When the result in S18 is NO, the program goes to S22, in which it is checked whether the lockup mechanism L of the torque converter 2 should be operated. When the result is YES, the program goes to S24, in which the currents supplied to the linear solenoid SL5 for on/off control and the linear solenoid SL6 for capacity control are controlled.

When the result in S22 is NO, the program goes to S26, in which the supply of current is controlled so as to effect cleaning, i.e., to remove grit that has infiltrated the pressure control valve 100 etc., by use of dither current to oscillate or vibrate the valve, and then restore normal operation.

The fact that the program has advanced to S26 means that gear-shift is not in progress and line pressure is therefore being supplied to the clutch hydraulic chambers. What is important here is that the dither current is supplied after determining that the oil lines for supplying the hydraulic pressure controlled by the linear solenoids SL3 (SL4) etc. to the clutch hydraulic chambers are not open. Thus, since the hydraulic pressure regulated by the pressure control valve is not supplied to the clutch hydraulic chamber in this state, it is safe to apply high-amplitude dither current to ensure reliable removal of infiltrated grit, whereafter normal operation can be restored. As no danger of increased gear-shift shock or clutch vibration arises even if the hydraulic control pressure fluctuates greatly, grit can be completely and reliably removed.

Figure 4:
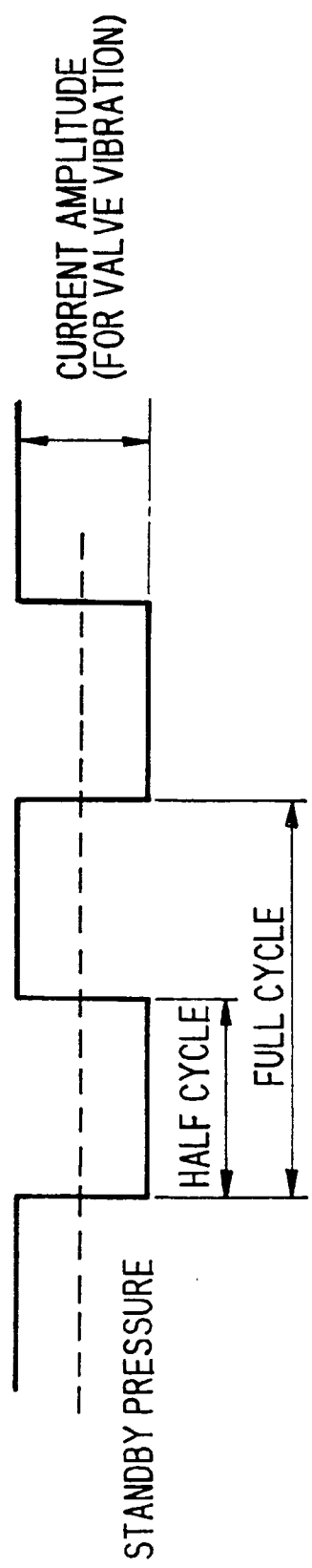
FIG. 4 is a time chart showing the pattern of the dither current to be used in the cleaning procedure referred to in the flow chart of FIG. 3.

The pattern of the current applied to the linear solenoids SL3, SL4 during cleaning (the dither current) is shown in FIG. 4. As illustrated, the linear solenoid SL3, SL4 are applied with drive pulses having a duty ratio (ON time t/Period T) of 50% (t/T=1.5 sec/3.0 sec).

Figure 5:
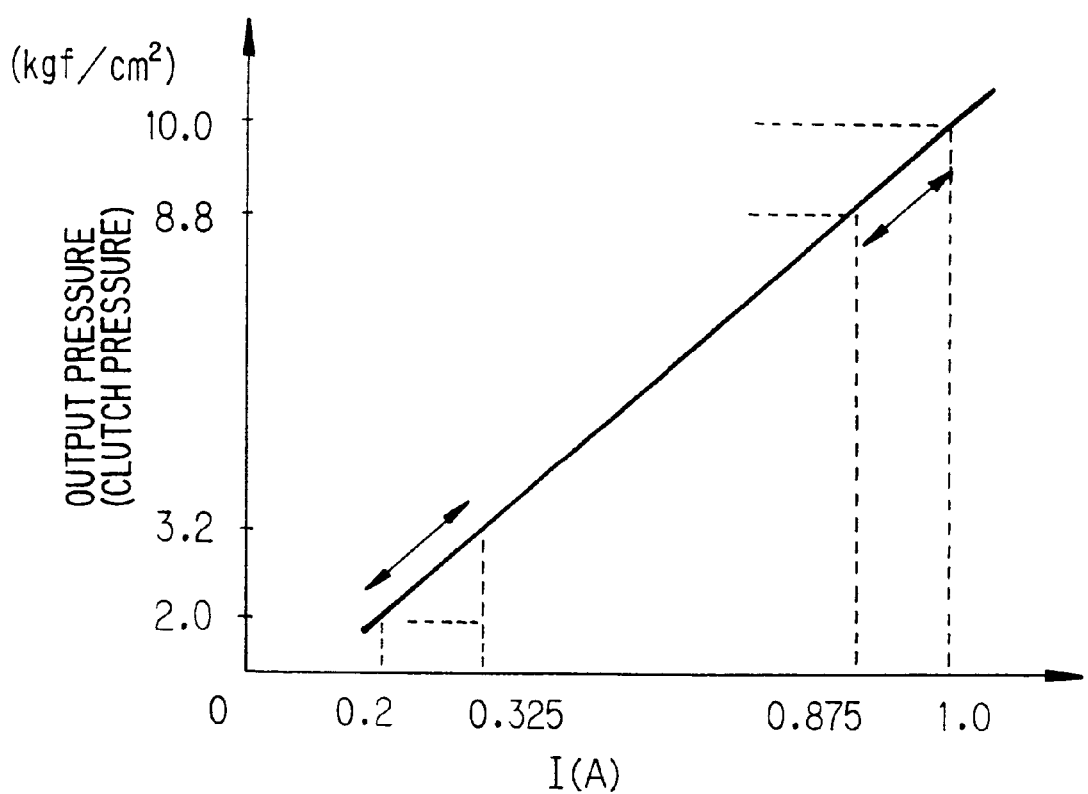
FIG. 5 is an explanatory graph showing the amplitude of the current to be supplied in the manner shown in FIG. 4.

As shown in FIG. 5, the current amplitude determined as 0.125 A by, for example, varying the current between 0.2 A and 0.325 A or between 0.875 A and 1.0 A. The amplitude of 0.125 A is set as a value ensuring reliable grit removal if the amplitude of the drive pulses is set at least at this level.

The linear solenoids SL3, SL4 are supplied with currents proportional to the applied pulses and, as a result, their plungers 105 and the valve bodies 108 of the pressure control valves 100 repeatedly perform forward and backward strokes at a frequency proportional to the current amplitude. (The broken line in FIG. 4 indicates standby pressure; the repeated change in current amplitude also raises and lowers the clutch hydraulic pressure.)

The repeated piston-like motion of the linear solenoids SL3, SL4 and the pressure control valves 100 oscillated in this manner enables removal of grit even of a grain diameter under 100 μm that may cause locking, abnormal stroke or the like by infiltrating the space between a plunger of the linear solenoid SL3 or S3 and the associated side wall or between a valve body 108 of a pressure control valve 100 and the associated side wall.

The embodiment is thus configured to have a system for controlling an automatic vehicle transmission T, including a gear system and engaging elements (i.e., the hydraulic clutches C1, C2, C3, C4R) which hold a member of the gear system stationary (on the main shaft MS or the countershaft CS) to produce gear reduction or reverse, comprising an oil line which connects the engaging elements to an oil pressure source, an actuator 300 provided in the oil line which generates a first (regulated) oil pressure to be supplied to one of the engaging elements in response to a current supplied thereto, current supply means (ECU) for supplying the current to the actuator, the switch valve 200 provided in the oil line which switches the oil pressure to be supplied to said one of the engaging elements between the first oil pressure and a second (line) pressure, and discriminating means (S10–S24) for discriminating whether the first oil pressure is not supplied to said one of the engaging elements, wherein said current supply means supplies the current to the actuator such that the actuator repeatedly performs a vibrational motion to remove a grit therefrom, when said discriminating means discriminates that the first oil pressure is not supplied to the one of the engaging elements.

In the system, said actuator includes a pressure control valve 100 provided in the oil line and having a valve (spool) 104 movable in the valve body 108, a solenoid SL3 (SL4) with the plunger 105 connected to the pressure control valve in such a manner that the plunger moves to press the valve in response to the current supplied by said current supply means. Said switch valve includes a valve (spool) 204 movable in a valve body, the on/off solenoid 208 with a plunger connected to the valve in such a manner that the plunger moves to press the valve in a first position in which the first oil pressure is supplied to the one of the frictional engaging elements through the actuator and a second position in which the second oil pressure is supplied to the one of the frictional engaging elements from the oil pressure source.

In the system, said valve moves to the second position when gear shifting is not in progress and said discriminating means discriminates whether the first oil pressure is not supplied to said one of the engaging elements by determining whether the gear shifting is not in progress. The system further includes the torque converter lockup mechanism L, wherein said discriminating means discriminates whether the first oil pressure is not supplied to said one of the engaging elements by determining whether the gear shifting is not is progress and the torque converter lockup mechanism is not in operation.

In the system, the engaging elements are hydraulic clutches.

In the system, the second pressure is a line pressure.

In the system, said current supply means supplies the current in pulse having a predetermined duty ratio.

The discriminating means can be constituted to detect the position of the spool 204 of the switch valve 200.

Although this embodiment supplies dither current only to the linear solenoids SL3, SL4, dither current with the same properties can also be supplied to the other linear solenoids SL1, SL2, SL5 and SL6.

Although the invention has been described with reference to the transmission shown in FIG. 1, the invention can instead by applied to the transmission having a planetary gear system.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling an automatic vehicle transmission, including a gear system and engaging elements which hold a member of the gear system stationary to produce gear reduction or reverse, comprising:
   an oil line which connects the engaging elements to an oil pressure source;
   an actuator provided in the oil line which generates a first oil pressure to be supplied to one of the engaging elements in response to a current supplied thereto;
   current supply means for supplying the current to the actuator;
   a switch valve provided in the oil line which switches the oil pressure to be supplied to said one of the engaging elements between the first oil pressure and a second pressure; and
   discriminating means for discriminating whether the first oil pressure is not supplied to said one of the engaging elements;
   wherein:
      said current supply means supplies the current to the actuator such that the actuator repeatedly performs a vibrational motion to remove a grit therefrom, when said discriminating means discriminates that the first oil pressure is not supplied to the one of the engaging elements.

2. A system according to claim 1, wherein said actuator includes:
   a pressure control valve provided in the oil line and having a valve movable in a valve body;
   a solenoid with a plunger connected to the pressure control valve in such a manner that the plunger moves to press the valve in response to the current supplied by said current supply means.

3. A system according to claim 1, wherein said switch valve includes;
   a valve movable in a valve body;
   a solenoid with a plunger connected to the valve in such a manner that the plunger moves to press the valve in a first position in which the first oil pressure is supplied to the one of the frictional engaging elements through the actuator and a second position in which the second oil pressure is supplied to the one of the frictional engaging elements from the oil pressure source.

4. A system according to claim 3, wherein said valve moves to the second position when gear shifting is not in progress.

5. A system according to claim 4, wherein said discriminating means discriminates whether the first oil pressure is not supplied to said one of the engaging elements by determining whether the gear shifting is not in progress.

6. A system according to claim 4, further including a torque converter lockup mechanism, wherein said discriminating means discriminates whether the first oil pressure is not supplied to said one of the engaging elements by determining whether the gear shifting is not is progress and the torque converter lockup mechanism is not in operation.

7. A system according to claim 1, wherein the engaging elements are hydraulic clutches.

8. A system according to claim 1, wherein the second pressure is a line pressure.

9. A system according to claim 1, wherein said current supply means supplies the current in pulse having a predetermined duty ratio.

10. A method of controlling an automatic vehicle transmission, including:
    a gear system and engaging elements which hold a member of the gear system stationary to produce gear reduction or reverse;
    an oil line which connects the engaging elements to an oil pressure source;
    an actuator provided in the oil line which generates a first oil pressure to be supplied to one of the engaging elements in response to a current supplied thereto; and
    a switch valve provided in the oil line which switches the oil pressure to be supplied to said one of the engaging elements between the first oil pressure and a second pressure;
    wherein the method comprising the step of:
       discriminating whether the first oil pressure is not supplied to the one of the engaging elements;
       supplying the current to the actuator such that the actuator repeatedly performs a vibrational motion to remove a grit therefrom, when it is discriminated that the first oil pressure is not supplied to the one of the engaging elements.

11. A method according to claim 10, wherein said actuator includes:
    a pressure control valve provided in the oil line and having a valve movable in a valve body;
    a solenoid with a plunger connected to the pressure control valve in such a manner that the plunger moves to press the valve in response to the current supplied by said current supply means.

12. A method according to claim 10, wherein said switch valve includes;

a valve movable in a valve body;

a solenoid with a plunger connected to the valve in such a manner that the plunger moves to press the valve in a first position in which the first oil pressure is supplied to the one of the frictional engaging elements through the actuator and a second position in which the second oil pressure is supplied to the one of the frictional engaging elements from the oil pressure source.

13. A method according to claim 12, wherein said valve moves to the second position when gear shifting is not in progress.

14. A method according to claim 13, wherein discriminating whether the first oil pressure is not supplied to said one of the engaging elements by determining whether the gear shifting is not in progress.

15. A method according to claim 14, further including a torque converter lockup mechanism, and wherein discriminating whether the first oil pressure is not supplied to said one of the engaging elements by determining whether the gear shifting is not is progress and the torque converter lockup mechanism is not in operation.

16. A method according to claim 10, wherein the engaging elements are hydraulic clutches.

17. A method according to claim 10, wherein the second pressure is a line pressure.

18. A method according to claim 10, wherein supplying the current in a pulse having a predetermined duty ratio.

19. A computer program embodied on a computer-readable medium for of controlling an automatic vehicle transmission, including:

a gear system and engaging elements which hold a member of the gear system stationary to produce gear reduction or reverse;

an oil line which connects the engaging elements to an oil pressure source;

an actuator provided in the oil line which generates a first oil pressure to be supplied to one of the engaging elements in response to a current supplied thereto; and a switch valve provided in the oil line which switches the oil pressure to be supplied to said one of the engaging elements between the first oil pressure and a second pressure;

wherein the computer program comprises the steps of:
discriminating whether the first oil pressure is not supplied to said one of the engaging elements;
supplying the current to the actuator such that the actuator repeatedly performs a vibrational motion to remove a grit therefrom, when it is discriminated that the first oil pressure is not supplied to said one of the engaging elements.

* * * * *